UNITED STATES PATENT OFFICE.

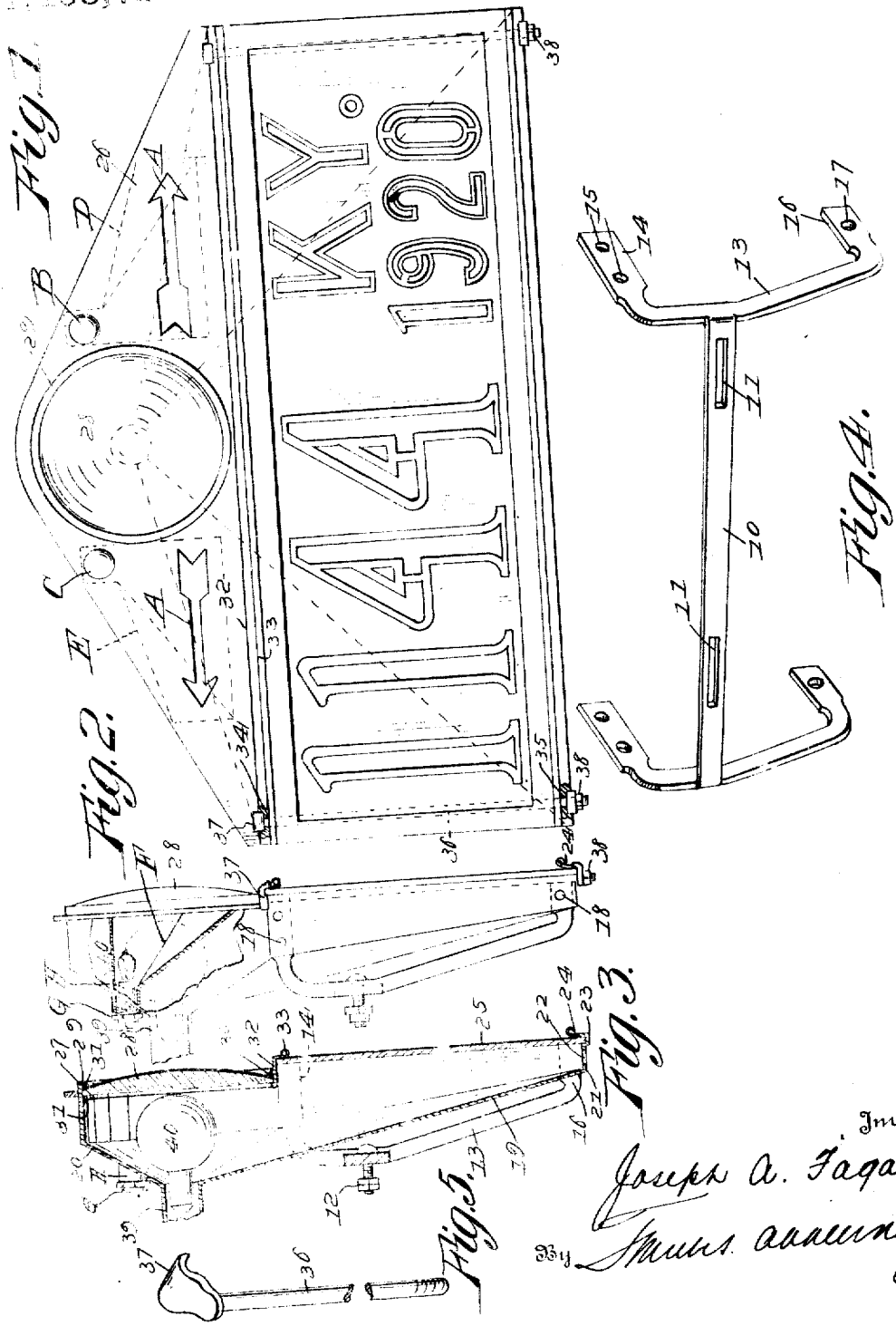

JOSEPH A. FAGAN, OF AUGUSTA, KENTUCKY.

SIGNAL LIGHT AND LICENSE-PLATE HOLDER FOR AUTOMOBILES.

1,408,726.         Specification of Letters Patent.         Patented Mar. 7, 1922.

Application filed July 12, 1920.   Serial No. 395,614.

*To all whom it may concern:*

Be it known that I, JOSEPH A. FAGAN, a citizen of the United States of America, and resident of Augusta, in the county of Bracken and State of Kentucky, have invented new and useful Improvements in Signal Lights and License-Plate Holders for Automobiles, of which the following is a specification.

This invention relates to signal lights and license plate holders for automobiles, the said invention having for its object the provision of a bracket which may be attached to license plate holders such as are usually supplied as equipments with automobiles, and novel lamp and light or illuminated compartments for displaying the light from an electric lamp through a lens and through perforations or openings in the license plate, the said openings having the outline of numbers, letters or other indicia employed as designating the identity of the automobile carrying the license plate.

A still further object of this invention is to produce a housing which includes the lamp chamber and the light chamber having novel means whereby the license plate can be readily applied to or removed from the housing or casing so that one equipment may be employed in connection with successive license plates as they are supplied periodically.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a combined lamp and license bracket embodying the invention;

Figure 2 illustrates an end elevation thereof;

Figure 3 illustrates a vertical central sectional view thereof;

Figure 4 illustrates a perspective view of a bracket and frame, and

Figure 5 illustrates a perspective view of the license plate clamping screws.

In these drawings 10 denotes a bar having slots 11 therein to receive fastenings such as bolts 12 by which the device may be secured to the usual license brackets of automobiles, the said bar having approximately C-shaped end brackets 13, the upper arm 14 of which has apertures 15, and the lower arm 16 of which has an aperture 17 intended for the reception of fastenings 18 such as rivets.

The lamp and light housing has a rear wall 19 which is slightly inclined and terminates at the top in a hood 20 forming the upper wall of the lamp chamber. There is a bottom plate 21 having apertures 22 for drainage purposes, the said bottom terminating in a channel 23 and an upwardly disposed flange 24 forming a seat for the license plate 25. The hood has a face plate 26 with an aperture 27 therein constituting an opening for the lens 28 which may be of any appropriate color, but preferably red for the rear of the automobile and white for the front thereof. The hood has a beaded flange as at 29 which is intended to hold the securing ring 30 by which the lens is held in place, it being shown in the drawing that the rear surface of the lens at the edge rests against a bead 31 on the inner wall of the side of the hood where the lens opening is formed.

The lower edge of the face plate has an outwardly extending flange 32 and a downwardly extending flange 33 to engage the license plate. The outwardly extending flange 32 has an aperture 34 near each end, and the bottom 21 has an aperture 35 at each end being in alinement and serving to receive the shank 36 of the clamp 37 which clamp has a head to embrace the upper edge of the license plate so that when the nut 38 which is threaded on the lower end of the shank is operated, the clamping head is caused to exert pressure on the license plate to hold it in its seat, although it can be readily removed by the loosening of the nuts 38.

It has been found that a device made in accordance with this invention has advantages in that it is strong and durable, and the fastenings 18 which clamp the C-shaped brackets to the ends of the housing rigidly hold the parts and produces a license plate displaying element or member having advantages over those now in common use. Of course the housing may be supplied with any type of lamp socket as at 39, the lamp 40 being of the usual type employed in automobile illumination. As one skilled in the art will understand the application of the lamp socket and the lamp, a conventional showing of the drawing is believed to be sufficient as a disclosure of this feature.

If desired, the surface of the face plate at the bottom may have the name and address of the owner indicated thereon as a permanent sign.

The face plate has direction indicators such as arrows A cut from the face plate which are intended to be illuminated. One arrow points in one direction and one in the other and either can be illuminated at the pleasure of the operator by suitable switch and circuit controlling elements which are of well known construction and arrangement and need not, it is thought, be shown diagrammatically. One skilled in the art would readily understand how it would be possible to provide switches for controlling the circuit to either of the lamps B or C so that either one could be provided with current for illumination, and of course the driver would furnish the current to the one indicating the direction in which he is to turn. The face plate has the housings D and E back of the indicators A in which the lamps B and C are placed respectively so that light from either of the lamps will be confined and directed by reason of the inclined walls F, one of which is arranged in each of the enclosures D and E so that light will be directed through the indicators.

As a means for mounting the lamps B and C, the main housing has a tubular extension G back of each of the housings D and E, and each tubular extension is of such a size as to permit the small electric lamp to be inserted in it with its lamp socket H, the said lamp socket being secured in place by a nut I which is threaded in the tubular extension so that by turning the nut back to disengage the tubular extension, the lamp socket and the lamp may be removed.

I claim:

In a combined lamp and license plate holder, a casing comprising a rear wall terminating in a hood at the top, an apertured bottom, the said casing having a face plate with an aperture therein for a lens, means for securing the lens in the aperture, a flange extending outwardly from the lower edge of the face plate and terminating in a downwardly extending flange forming a seat, the said bottom having a channel and an upwardly extending flange at its outer edge, a license plate interposed between the bottom and the flange of the face plate, license plate clamps comprising threaded shanks with heads having recesses, the said shanks being insertable in apertures of the flange of the face plate and the bottom of the casing, the recessed heads of said clamping members embracing the edge of the license plate, and members threaded on the said shanks for drawing the head of the clamp into engagement with the said license plate.

JOSEPH A. FAGAN.